United States Patent [19]
Jannotta

[11] Patent Number: 5,136,883
[45] Date of Patent: Aug. 11, 1992

[54] LIQUID LEVEL GAGE SYSTEM

[76] Inventor: Louis J. Jannotta, 7940 Teton Rd., Orland Park, Ill. 60462

[21] Appl. No.: 572,661

[22] Filed: Aug. 24, 1990

[51] Int. Cl.$^5$ .................. G01F 23/26; G01N 9/08; G01B 11/00
[52] U.S. Cl. .......................: 73/309; 33/708; 33/715; 33/293; 73/321; 73/DIG. 5; 250/357.1
[58] Field of Search .......... 73/321, 296, 309, DIG. 5, 73/293; 33/708, 713, 719, 720, 714, 715, 716; 250/357.1

[56] References Cited

U.S. PATENT DOCUMENTS

| | | | |
|---|---|---|---|
| 2,927,457 | 3/1960 | Pye et al. | 73/862.31 |
| 3,685,358 | 8/1972 | Hubner et al. | 73/321 |
| 3,798,969 | 3/1974 | Jones, Jr. | |
| 3,825,343 | 7/1974 | Moore | 33/DIG. 13 X |
| 3,969,941 | 7/1976 | Rapp | 73/321 X |
| 4,244,219 | 1/1981 | Takahashi | 33/716 X |
| 4,276,774 | 7/1981 | McGooken | 73/296 X |
| 4,342,996 | 8/1982 | Jannotta | |
| 4,422,328 | 12/1983 | Luchessa et al. | 73/321 X |
| 4,484,468 | 11/1984 | Gau et al. | 364/509 |
| 4,554,494 | 11/1985 | Howeth | |
| 4,676,099 | 6/1987 | McGookin | 73/290 B |
| 4,782,705 | 11/1988 | Hoffman et al. | |
| 4,813,275 | 3/1989 | Castor | |
| 4,819,340 | 4/1989 | DeForrest | 33/DIG. 13 X |
| 4,910,878 | 3/1990 | Fleckenstein et al. | 33/321 X |
| 5,012,589 | 5/1991 | Remion | 33/719 X |

Primary Examiner—Daniel M. Yasich
Attorney, Agent, or Firm—Frank J. Uxa, Jr.

[57] ABSTRACT

A liquid level gage system is disclosed. This system includes a displacer secured to a cable and movable in response to winding or unwinding said cable around or from around a rotatable drum. The rotatable drum is coupled to a driven shaft, and a drive assembly is provided to drive the driven shaft. An indicator subsystem is included which provides an indication of a change in the apparent weight of the displacer as the displacer is moved across a liquid level. A strain gage is a key component of the indicator subsystem. In one embodiment, an assembly is provided for powering the indicator subsystem and transferring data from the indicator subsystem which involves two pair of coils. In another embodiment, the gage system can be effectively remotely programmed using light signals.

25 Claims, 5 Drawing Sheets

LIQUID LEVEL GAGE SYSTEM

BACKGROUND OF THE INVENTION

This invention relates to a liquid level gage system useful in determining the level of one or more liquids in a vessel, e.g., a storage tank or the like. More particularly, this invention relates to a liquid level gage system including a displacer which is moved up and down in a vessel to provide signals which can be used to determine the level of one or more liquids in the vessel.

The height or level of a liquid in a storage tank is conventionally determined using a displacer which is secured to a cable and moveable in response to winding or unwinding the cable around or from around a rotatable drum. The drum is coupled to a shaft which is driven, e.g., by a servo motor. Hall effect sensors involving mechanical springs are conventionally used to determine differences in the apparent weight of the displacer as it moves from a liquid phase into a gaseous phase above the liquid phase, or vise versa. Using an optical shaft encoder, one can determine the height of the liquid-gas phase separation.

While such "Hall effect sensor" liquid level gage systems are useful in many situations, they do have certain shortcomings. For example, the accuracy and/or reproducibility of such gage systems is somewhat less than optimum. The mechanical components, in particular the springs, of such gage systems are prone to wear and fatigue, which can cause unreliable or unreproducible liquid level determinations. In addition, in certain situations, it is desirable to determine not only the level of the phase separation between a liquid phase and a gaseous phase, e.g., between a hydrocarbon-rich liquid phase and a gaseous phase, but also between two different liquid phases of relatively similar specific gravities. The "Hall effect sensor" gage systems are not reliable in providing such liquid/liquid phase separation level determination.

Therefore, there exists a need for a new liquid level gage system.

SUMMARY OF THE INVENTION

A new liquid level gage system has been discovered. The present liquid level gage system provides liquid level determinations with a high degree of accuracy, reliability, and reproducibility. In particular, the present system is able to determine the point of phase separation in a vessel between liquids having relatively similar specific gravities. In addition, the present system is durable, and relatively easy to manufacture, assemble and operate.

In one broad aspect of the present invention, a liquid level gage system is provided which includes a displacer secured to a cable and moveable in response to winding or unwinding the cable around or from around a rotatable drum. The rotatable drum is coupled to a driven shaft. Drive means are provided to drive the driven shaft. An indicator means, including at least one strain gage, acts to provide an indication of a change in the apparent weight of the displacer as the displacer is moved across a liquid level. The use of a strain gage provides an unexpected increase in the accuracy of the present liquid level gage system, relative to, for example, the previously noted "Hall effect sensor" liquid level gage systems.

In one embodiment, the indicator means includes an elongated member secured to the driven shaft, with the strain gage being secured to the elongated member away from the driven shaft. In this embodiment, the strain placed on the elongated member as the shaft is rotated, varies in response to variations in the apparent weight of the displacer. In a particularly useful embodiment, the present gage system comprises two strain gages secured to the elongated member away from the shaft. In this embodiment, one strain gage is preferably put under tension and the other strain gage is put under compression as the driven shaft rotates. The use of two strain gages increases the sensitivity of the liquid level gaging system.

Preferably, the drive means, in particular a driven gear, includes movement restrictor means which act to contact the elongated member to provide an operative coupling between the drive means and the driven shaft. Together with the driven shaft, the movement restrictor means act to place a strain on the elongated member. More preferably, the drive means further includes strain limiting means acting to limit the amount of strain imposed on the elongated member. This feature prevents excessive amounts of strain from being placed on the elongated member so as to substantially prevent the elongated member from being subjected to strains which could break the elongated member and disable the present gage system.

The rotatable drum is preferably magnetically coupled to the driven shaft. The drive means preferably includes a bi-directional servo motor having a motor shaft, a gear operatively coupled to the driven shaft and a worm gear coupled to both the motor shaft and the gear.

A position means is preferably included which acts to sense the number of full revolutions the motor shaft has gone through at a given time and to sense the amount of a fractional revolution the motor shaft has gone through at a given time. Thus, when the indicator means provides an indication that the apparent weight of the displacer has changed, the position means provides information indicative of the height in the vessel at which this change in apparent weight occurred. In this manner, the liquid level can be determined. By knowing the specific gravities of each of the materials in the vessel, one can relate the extent of the variation in the apparent weight of the displacer to the difference in specific gravities and, thus, be able to determine which liquid level is being sensed, e.g., whether it is a gas/liquid interface or a liquid/liquid interface.

In another broad aspect of the present invention, a liquid level gage system is provided for determining at least one liquid level in a vessel. The system includes a processor board containing the necessary conventional circuitry to process data and communicate information. In this embodiment, a light signal detector means coupled to the processor board is provided and acts to receive light signals indicative of information to be inputed into the processor board and to input such information into such processor board. A remote light signal transmitter means is also provided and acts to transmit light signals to the light signal detector means. Such light signals represent information to be inputed into the processor board. The use of this remote programming feature allows making rapid and reliable changes in the gage system, e.g., without having to program this information into the processor board from a centrally located computer.

In a further broad aspect of the present invention, a liquid level gage system is provided which includes a displacer secured to a cable and moveable in response to winding and unwinding the cable around or from around a rotatable drum. The rotatable drum is coupled to a driven shaft, and a drive means to drive the driven shaft is provided. An indicator means is coupled to the driven shaft and acts to provide an indication of a change in the apparent weight of the displacer as the displacer is moved across the liquid level. In this aspect of the invention, a first power coil and a second power coil which is rotatable relative to the first power coil and is in direct electrical communication with the indicator means is provided. The first power coil is in direct electrical communication with a source of electrical power and is located relative to the second power coil so as to provide electrical power to the second power coil for operation of the indicator means. In addition, a first data coil and a second data coil which is rotatable relative to the first data coil are provided. The second data coil is in electrical communication with the indicator means and receives a signal from the indicator means which varies in response to changes in the apparent weight of the displacer. The first data coil is located relative to the second data coil so as to receive the signal from the second data coil, e.g., and to pass it on for further processing to determine the liquid level in a vessel. This feature of the invention allows for easy and effective transfer of power and data, e.g., between the indicator means and a primary processor board which controls the gage system.

Each of the features of the present invention can be employed with one or more other features of the present invention, as may be appropriate.

These and other aspects and advantages of the present invention are set forth in the following detailed description and claims, particularly when considered in conjunction with the accompanying drawings in which like parts bear like reference numerals.

DETAILED DESCRIPTION OF THE DRAWINGS

Figure 1:
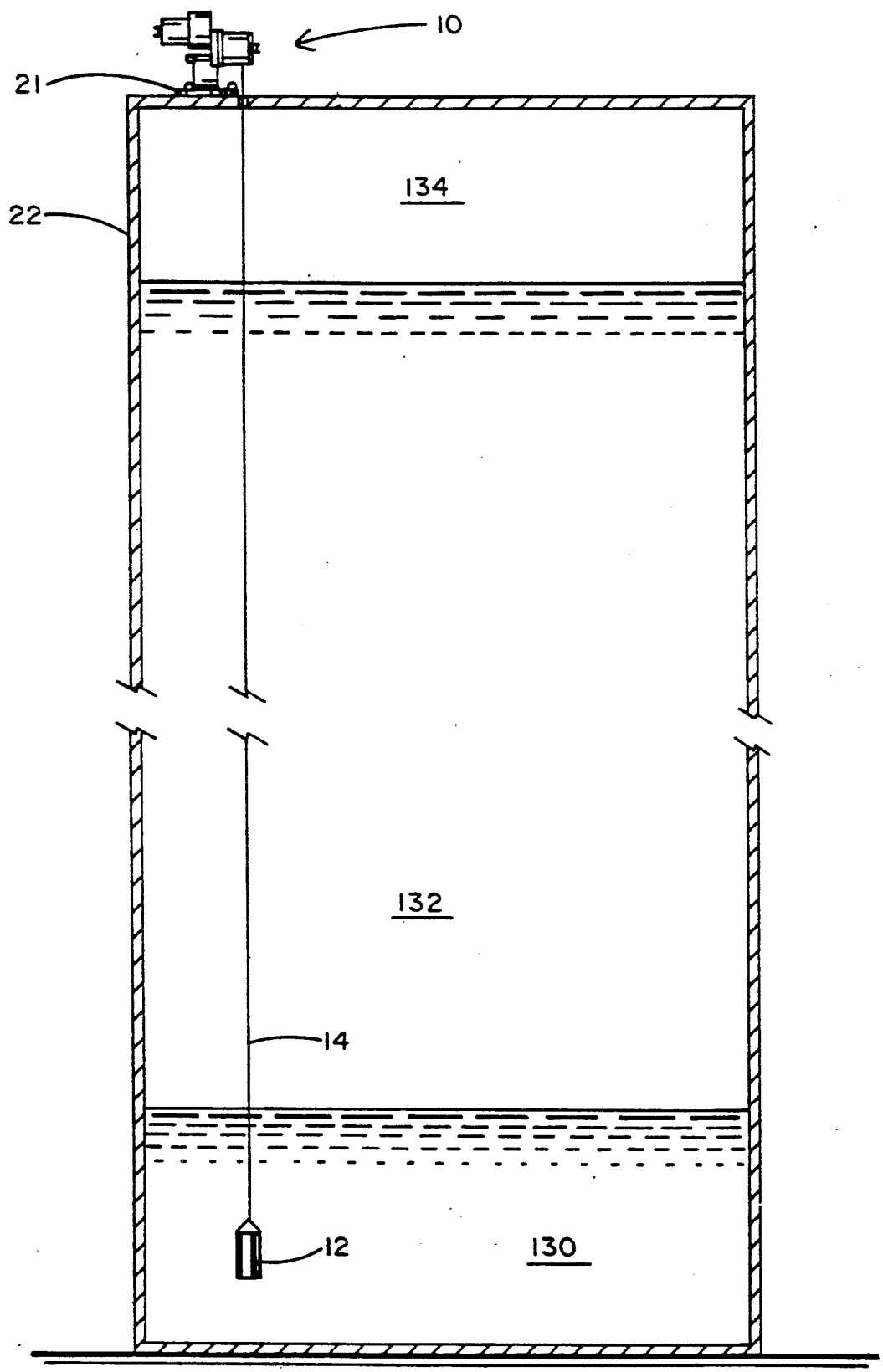
FIG. 1 is a schematic view showing one embodiment of the liquid level gage system of the present invention in use.
Figure 2:
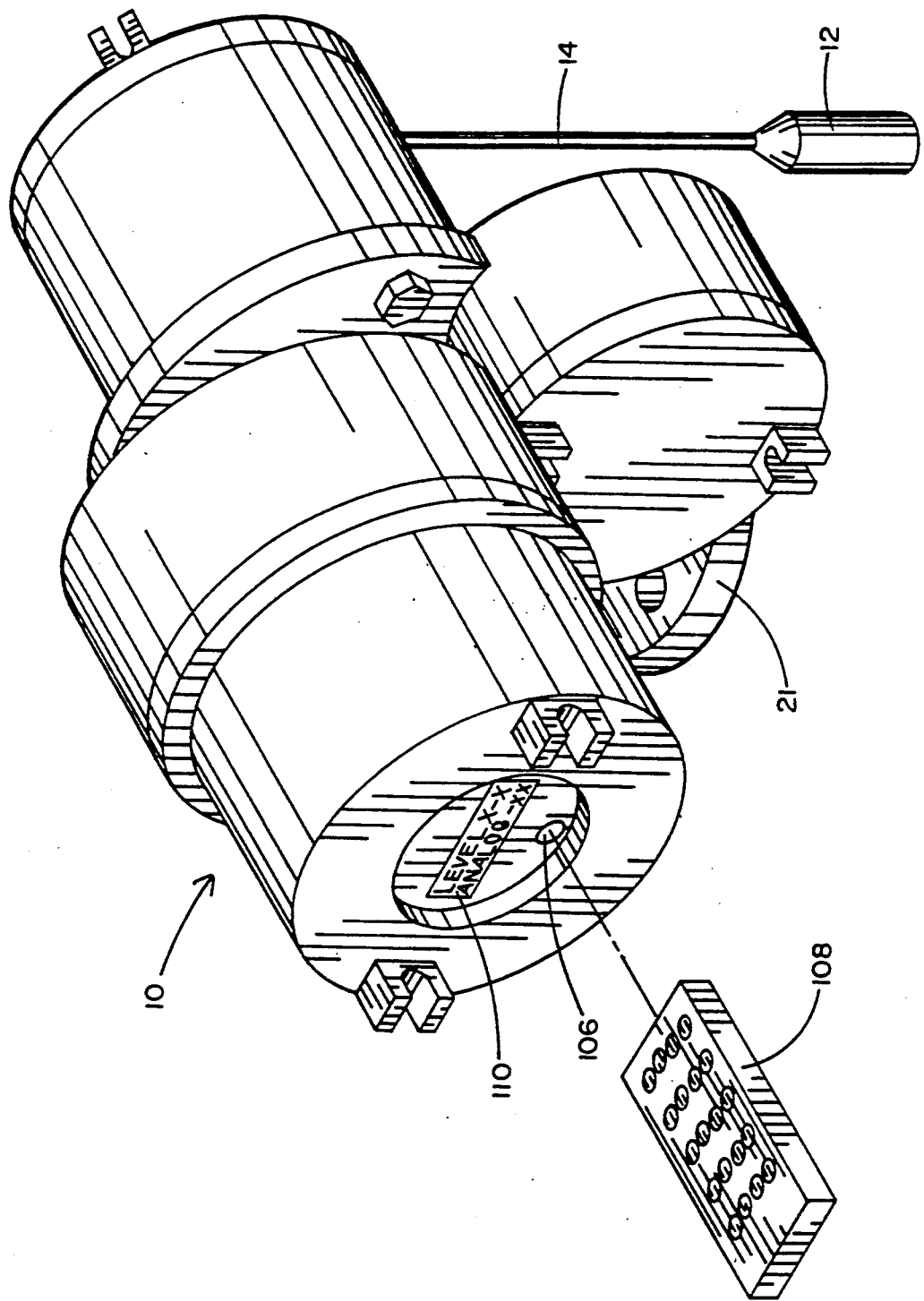
FIG. 2 is a front-side view, in perspective, showing certain components of the gage system embodiment shown in FIG. 1.
Figure 3:
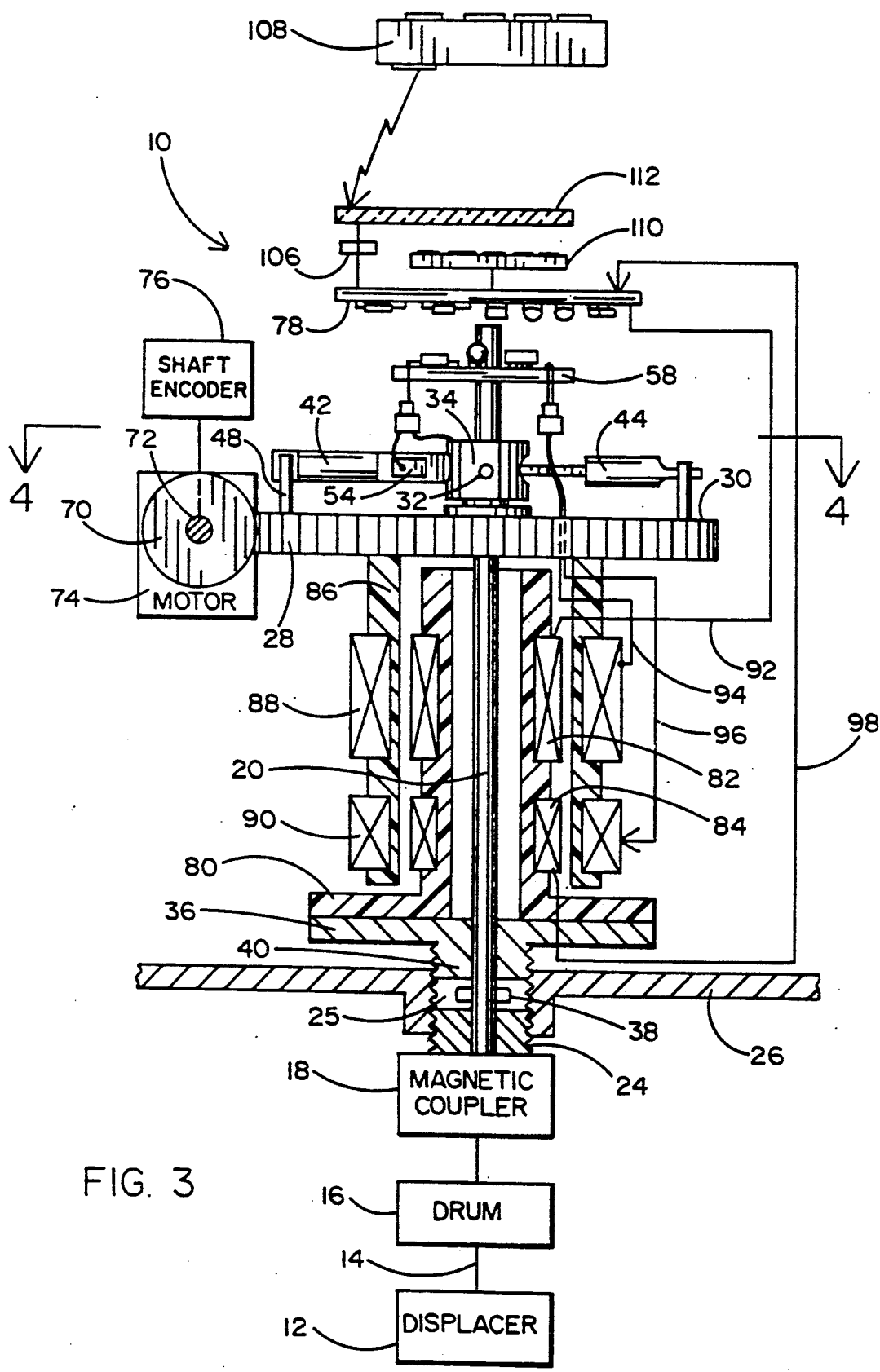
FIG. 3 is a generally schematic illustration showing in detail certain components of the gage system embodiment shown in FIG. 1.

A liquid level gage system of the present invention, shown generally at 10, includes a displacer 12 which is secured to the end of a flexible cable 14. Gage system 10 includes a mounting element 21 which is bolted to a liquid hydrocarbon-containing tank 22 to secure the system to the tank. A rotatable drum 16 is provided. As drum 16 rotates in one direction, cable 14 is wound around the drum. Conversely, as drum 16 rotates in the other direction, cable 14 is unwound from around the drum. A magnetic coupler, shown schematically at 18, is used to couple drum 16 to a rotatable driven shaft 20. Magnetic coupler 18 may be of conventional design, e.g., such as that used in a liquid level gage sold by L&J Engineering Inc. under the trademark MCG 1500. Magnetic coupler 18, which may involve one or more permanent magnets and/or electromagnets, preferably permanent magnets, acts to couple drum 16 to driven shaft 20 so that the drum rotates as the driven shaft rotates to wind or unwind cable 14 and move displacer 12 up or down in liquid hydrocarbon-containing tank 22.

Magnetic coupler 18 includes a stationary, i.e., non-rotating, threaded connection 24 which is threaded into a threaded hole 25 in plate 26. This plate 26, which extends across the entire housing of gage system 10, effectively isolates the electronic components of the gage system from the hydrocarbon contained in tank 22.

The driven shaft 20 extends from the magnetic coupler 18 through a driven gear 28 and terminates a distance beyond the surface 30 of the driven gear. Driven shaft 20 is operatively, but not directly, coupled to driven gear 28. Driven shaft 20 is held generaly in place along its longitudinal dimension by the cooperation of at least two (2) elements. First, driven shaft 20 is secured by screw 32 to enlarged element 34. This effectively prevents driven shaft 20 from moving toward magnetic coupler 18. In addition, a metal fitting 36 is placed around driven shaft 20. A clip 38 is placed in a groove in driven shaft 20 and together with metal fitting 36 acts to prevent the driven shaft from being moved away from magnetic coupler 18. Metal fitting 36 includes a threaded extension 40 which is threaded into and secured in threaded hole 25 of plate 26.

Figure 4:
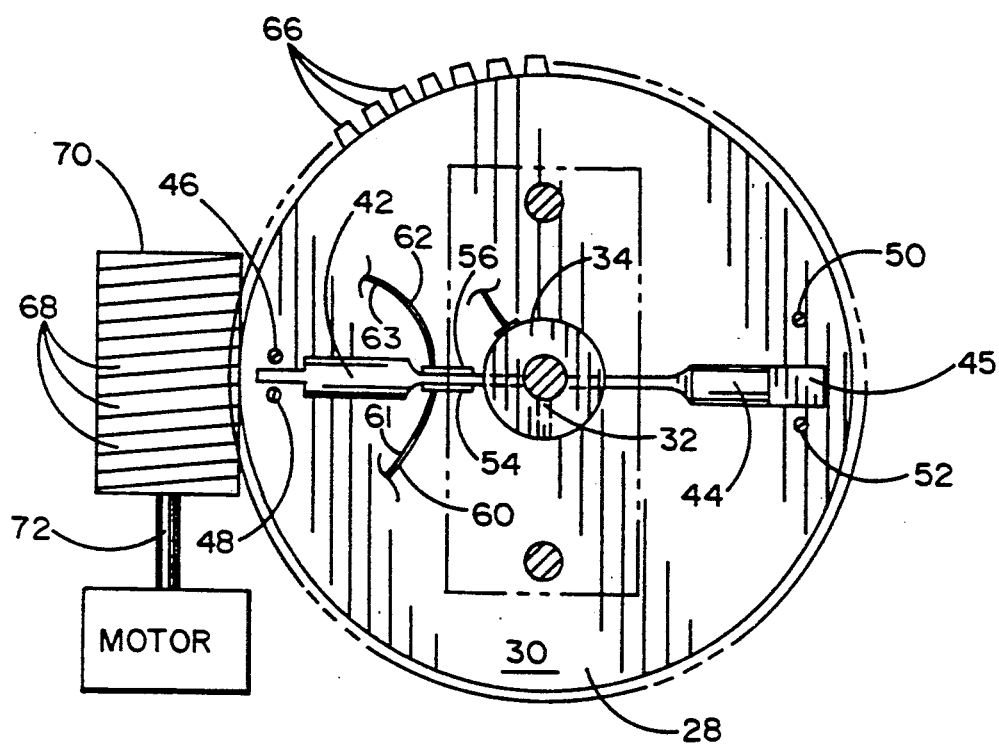
FIG. 4 is a plan view taken generally along line 4—4 of FIG. 3.
Figure 5:
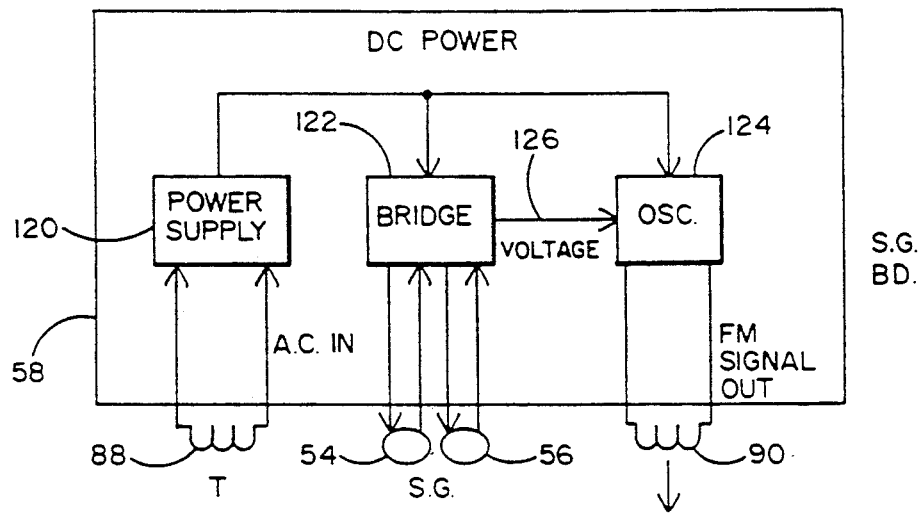
FIG. 5 is a schematic circuit diagram of the strain gage board of the gage system embodiment shown in FIG. 1.

First and second elongated members 42 and 44, respectively, are secured to enlarged element 34 (by screws) and extend radially outwardly from the enlarged element at 180° relative to each other. First elongated element 42 extends beyond first and second drive pegs 46 and 48 respectively, as best shown in FIG. 4. Second elongated element 44 extends beyond first and second restrictor pegs 50 and 52, respectively, also as best shown in FIG. 4. Each of the drive pegs 46 and 48 and the restrictor pegs 50 and 52 is secured to and rotates with the driven gear 28. Second elongated element 44 is oriented so that a relatively wide portion 45 of second elongated element 44 is located between restrictor pegs 50 and 52, and parallel to surface 30 of driven gear 28.

First and second strain gage elements 54 and 56, respectively, are secured, e.g., using adhesives, to first elongated element 42. Each of first and second strain gage elements 54 and 56 is secured on opposite sides of first elongated element 42 equidistantly away from driven shaft 20. First and second strain gage elements 54 and 56 may be selected from various strain gage elements which have been employed in other applications to measure strain. Preferably, both first and second strain gage elements 54 and 56 are of substantially the same construction. Among the useful strain gage elements are those which are commonly known as "thin film" strain gages or strain gage elements. Particularly useful strain gage elements for use in the gage system 10 are those of the HBM Series sold by Omega, Inc.

First and second strain gage elements 54 and 56 are in direct electrical communication with strain gage board 58 via wires 60 and 61 and wires 62 and 63, and connector 64. Strain gage board 58 is secured to driven shaft 20 and rotates with the driven shaft.

Driven gear 28 includes teeth 66 which mesh with teeth 68 of worm gear 70 which is secured directly to drive shaft 72 of bi-directional servo motor 74. Thus, driven gear 28 is driven by servo motor 74. Although any suitable bi-directional motor may be employed, a particularly useful bi-directional servo motor for use in the present invention is an SC Series motor sold by Hurst Motors, Inc.

A shaft encoder 76 is provided and acts to determine the number of full rotations the motor shaft 72 has gone through in one direction in a given increment of time and the absolute amount of the fractional rotation that the motor shaft has gone through at a given point in time. Shaft encoder 76 is in incremental encoder for full shaft rotations and is an absolute encoder for the amount of the fractional shaft rotation. This information regarding the number of full rotations and rotational position of the motor shaft 72 is provided to a primary processor board 78 where such information is processed into the position of displacer 12. Any suitable shaft encoder may be employed. Included are shaft encoders which are conventional and well known in the art. A particularly useful shaft encoder for use in the present invention is that sold by L&J Engineering Inc. under the trademark MCG 2000 which has been modified to be an incremental full shaft rotation encoder and an absolute encoder for the amount of the fractional shaft rotation.

A plastic sleeve 80 is secured to metal fitting 36 and surrounds driven shaft 20. Plastic sleeve 80 extends from metal fitting 36 toward driven gear 28 but terminates short of the driven gear. Plastic sleeve 80 has imbedded in it a first power coil 82 and a first data coil 84. Plastic sleeve 80, first power coil 82 and first data coil 84 are each stationary relative to the rotation of driven shaft 20 as is discussed hereinafter. First power coil 82 is the primary coil of an electrical transformer, whereas first data coil 84 is the secondary coil of another electrical transformer. The materials of construction used to produce first power coil 82 and second power coil 84 (as well as the second power coil and second data coil discussed hereinafter) may be any suitable materials, e.g., wire stock, useful in electrical transformer coils. Specific examples include copper wire and the like electrically conductive materials.

Driven gear 28 includes a gear extension 86 in which is imbedded a second power coil 88 and a second data coil 90. Second power coil 88 is the secondary coil of the electrical transformer of which first power coil 82 is the primary coil. Second data coil 90 is the primary coil of the electrical transformer of which first data coil 84 is the secondary coil. Gear extension 86, second power coil 88 and second data coil 90 all rotate with driven shaft 20.

First power coil 82 is in direct electrical communication with primary processor board 78 via electrical line 92. Through this line 92, first power coil 82 is provided with electrical power. Second power coil 88 is in direct electrical communication with strain gage board 58 via electrical line 94. The transformer relationship between first power coil 82 and second power coil 88 allows electrical power from primary processor board 78 to be transferred to strain gage board 58 to operate the strain gage board 58 and the first and second strain gage elements 54 and 56. The strain gage board 58 contains conventional circuitry including an operational amplifier and oscillator for producing a frequency modulated signal indicating the strain sensed by the strain gage. Data from the strain gage board 58 is passed directly to second data coil 90 via electrical line 96. First data coil 84 is in direct electrical communication with processor board 78 via electrical line 98. Because of the transformer relationship between second data coil 90 and first data coil 84, data signals from strain gage board 58 are passed to the processor board 78. This method of powering up strain gage board 58 and transferring data from the strain gage board to the processor board 78 provides substantial advantages. A reduced amount of electrical wiring is required. None of the electrical wiring is required to rotate between a rotating object and a stationary object. Thus, little or no possibility exists for tangling wires and thereby immobilizing the gage system 10.

The processor board 78 is stationary, that is, it does not rotate with driven shaft 20. Processor board 78 includes computation circuits 100 which can be programmed to provide specific information to a remote computer via communication line 102. In addition, processor board 78 can be programmed with information, e.g., specific displacer weight information, liquid and gas specific gravity information, temperature information and the like, from a remote computer via communication line 104. A specific example of a remote computer that can be used with the gage system 10 is that sold by L&J Engineering Inc. under the trademark MCG 3400. A specific example of the computation circuits that can be used in the gage system 10 is that embodied in the No. 64180 microprocessor chip sold by Hitachi.

Instead of providing information input through communication line 104, gage system 10 is provided with a unique remote information input feature. Thus, processor board 78 includes an infra-red detector 106 which is capable of receiving modulated infra-red light signals from remote infra-red light transmitter 108 and inputing that information into the processor board 78. Any suitable infra-red detector may be employed in the present system. Specific examples of useful infra-red detectors are those of the IR-20 Series sold by Sharp Electronics. Similarly, any suitable infra-red light transmitter may be employed. A specific example of a useful transmitter is Model No. 15-1902 sold by Tandy. The information that is provided from the infra-red light transmitter 108 to the infra-red detector 106 is displayed on a display unit 110 which is coupled to processor board 78. In this manner, the operator of transmitter 108 can verify the correctness of the information inputed into processor board 78. Any suitable display unit may be employed. Specific examples of display units which may be employed are those of the DMC Series sold by Optrex, Inc. The protective housing of gage system 10 includes a glass window 112 through which the infra-red light can be transmitted from infra-red light transmitter 108 to infra-red detector 106 and through which the information inputed into processor board 78 can be visually verified by reading display unit 110.

Substantial advantages are obtained by using this remote programming feature. For example, if a condition exists at tank 22 which can be observed only by a manual inspection, the inspector can very quickly alter the operation of gage system 10 to conform more appropriately with that situation rather than having to relay the information back to a control room and asking the control room operator to make the change via communication line 104. Using this remote programming feature, a change can be very quickly inputed into gage system 10 and verified for accuracy.

The computation circuits 100 act to provide control information to a motor control circuit 114 which controls the operation of servo motor 74. That is, computation circuits 100 provide control information, such as frequency of motor operation, direction of motor operation and the like, to motor control circuits 114 so that, in effect, the computation circuits 100 control the operation of servo motor 78. Since computation circuits 100 can be programmed with motor control information, the operation of servo motor 74 can be adjusted or varied as desired to suit any particular application.

Figure 6:
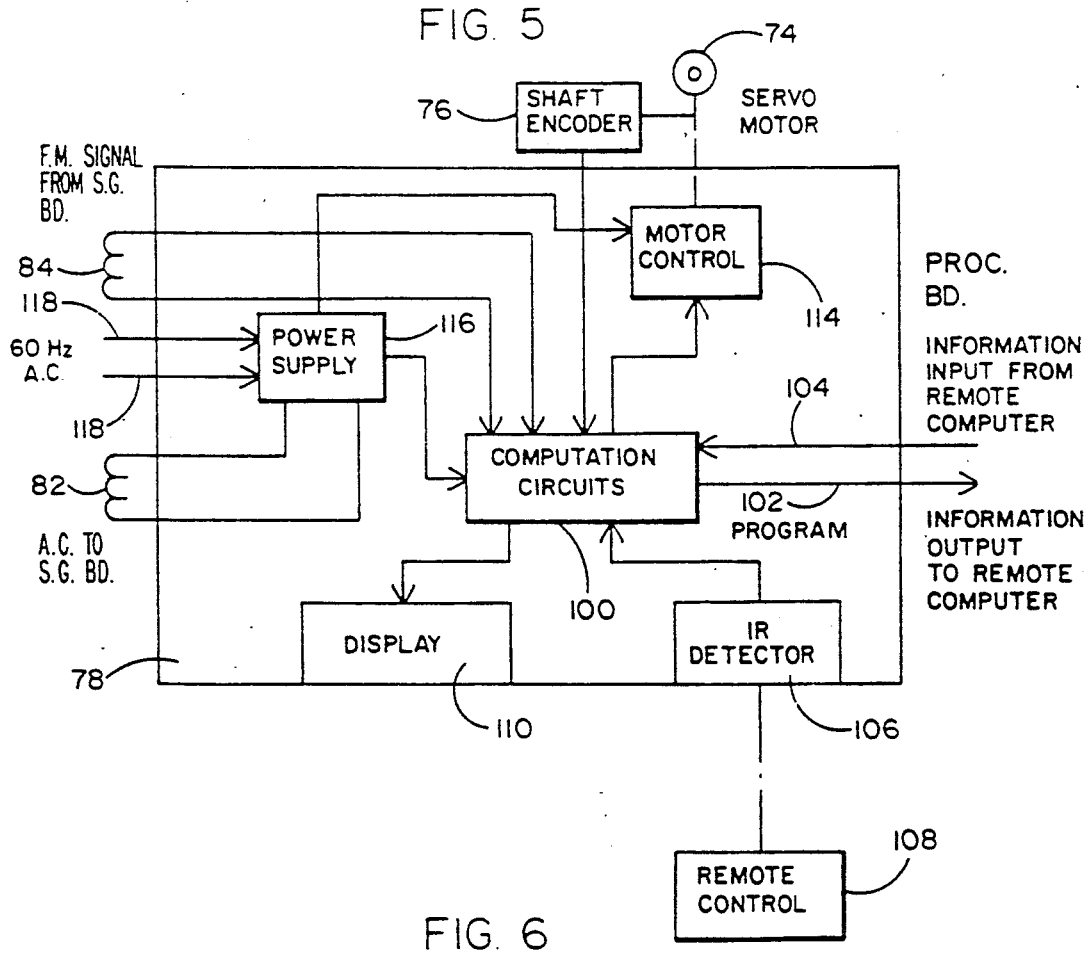
FIG. 6 is a schematic circuit diagram of the primary processor board of the gage system embodiment shown in FIG. 1.

Processor board 78 includes a power supply circuit 116 which is connected via electrical lines 118 to a conventional 60 Hz A.C. power source. Power supply circuit 116 provides power to the computation circuits 100, the motor control circuits 114 and the first power coil 82, as shown in FIG. 6.

Unless otherwise noted, the individual components of both the processor board 78 and strain gage board 58 may be selected from components which are conventional and well known in the art.

With regard to strain gage board 58, power from second power coil 88 is provided to an auxiliary power supply circuit 120 which provides electrical power to operate a Wheatstone bridge circuit 122 and a frequency-modulated oscillator 124. Wheatstone bridge circuit 122 includes first strain gage element 54 and second strain gage element 56 and is designed to provide an output voltage in line 126 to oscillator 124 which varies with the amount of strain measured by the strain gage elements in the Wheatstone bridge circuit 122. Oscillator 124 converts the voltage in line 126 into a frequency-modulated signal which is transmitted via first data coil 84 to processor board 78.

The liquid level gaging system 10 functions as follows. Tank 22 is equipped with liquid level gage system 10 and contains two liquid phases and one gaseous phase. As shown in FIG. 1, the lower liquid phase 130 is an aqueous liquid phase having one specific gravity, e.g., about 1. Located on top of this lower phase 130 is a hydrocarbon-rich liquid phase 132 which has an entirely different specific gravity, e.g., about 0.6 to about 0.7. Located above this hydrocarbon-rich phase liquid 132 is a gaseous phase 134 which has a substantially reduced specific gravity relative to either of the two liquid phases. The liquid level gage system 10 is able to determine the liquid level between phases 132 and 134 and, in addition, between the aqueous liquid phase 130 and hydrocarbon-rich liquid phase 132. In fact, gage system 10 is able to determine the interface between liquid phases which differ in specific gravity by as little as 10%. This is a substantial advantage relative to prior art "Hall effect" gage systems which often were unreliable in determining the interface between any two liquid phases, let alone liquid phases with relatively similar specific gravities, e.g., which differ by only about 10%.

After the gage system 10 is assembled and placed on tank 22, information regarding the specific gaging application involved, e.g., specific gravity information on each of the three phases, tank temperature information, motor control information and the like information, is provided to the computation circuits 100, either via communication line 104 or through remote infra-red light transmitter 108 and infra-red detector 106. Gage system 10 is then connected to an electrical power source through lines 118. On command from computation circuits 100, the servo motor 74 is activated to begin to lower displacer 12 into tank 22. As motor shaft 72 rotates, it carries worm gear 70 along with it. The teeth 68 of worm gear 70 mesh with the teeth 66 of driven gear 28. This causes driven gear 28 to rotate. As driven gear 28 rotates, one of the drive pegs 46 or 48 comes into contact with first elongated element 42. This contact causes driven shaft 20 to rotate with driven gear 28, and places a certain amount of strain on first elongated element 42, which strain is sensed by first and second strain gage elements 54 and 56. Through magnetic coupling 18, the rotation of driven shaft 20 causes drum 16 to rotate which, in turn, causes cable 14 to unwind and displacer 12 to move down into tank 22. Computation circuits 100 continually, on a frequent, periodic basis, inquire of shaft encoder 76 as to the number of full rotations motor shaft 72 has gone through. As displacer 12 moves from the gaseous phase 134 into the hydrocarbon-rich liquid phase 132, the strain on first elongated element 42 as measured by first and second strain gage elements 54 and 56 changes, in particular is reduced because of the increased buoyancy of the hydrocarbon-rich liquid phase 132 relative to the gaseous phase 134. At the point in time when this change in the strain measured by first and second strain gage elements 54 and 56 is noted and communicated to computation circuits 100, the computation circuits inquire of shaft encoder 76 as to the position of motor shaft 72 with respect to the amount of a fractional rotation the motor shaft has gone through at that particular time. Using the information on the number of full rotations and amount of a fractional rotation of motor shaft 72 from shaft encoder 76, computation circuits 100 can determine the position of displacer 12 in tank 22 at that particular time. The position of displacer 12 within tank 22 at this point in time corresponds very closely, e.g., within between about 0.01 inch to about 0.2 inch, to the upper level of hydrocarbon-rich liquid phase 132 in tank 22 (the position of the interface between gaseous phase 134 and liquid phase 134).

As displacer 12 continues to move down toward the bottom of tank 22, it passes from the hydrocarbon-rich liquid phase 132 into the aqueous liquid phase 130. Because the buoyancy of displacer 12 in aqueous liquid phase 130 is relatively greater than in hydrocarbon-rich liquid phase 132, the amount of strain on first elongated element 42 is again reduced. This reduction in strain is sensed by first and second strain gage elements 54 and 56. Signals related to this reduced strain are passed to computation circuits 100. At this point in time, computation circuits 100 inquire of shaft encoder 76 as to the position of motor shaft 72 with respect to the amount of a fractional rotation the motor shaft has gone through at that particular time so that the position of displacer 12 in tank 22 can again be determined. The position of displacer 12 within tank 22 at this point in time corresponds very closely, e.g., within between about 0.01 inch and about 0.2 inch, to the upper level of aqueous liquid phase 130 in tank 22 (the position of the interface between liquid phase 132 and 130).

After the displacer 12 has reached a certain point at or slightly below the interface between liquid phases 132 and 130, the servo motor 74 is reversed and the displacer 12 is moved upward in the tank 22.

In this mode of operation, the driven gear 28 rotates in the opposite direction. First elongated element 42 continues to contact the same one of the drive pegs 46 or 48 as when the displacer was moving down into tank 22. The strain on first elongated element 42 is again measured or sensed by first and second strain gage elements 54 and 56. By correlating the position of displacer 12 in tank 22 to an increase in the strain on first elongated element 42, a separate determination of the height of the level between hydrocarbon-rich liquid phase 132 and gaseous phase 134 is made with the displacer 12 being moved toward the top of tank 22 In this manner, one can easily check on the accuracy of the level determination between phases 132 and 134 previously made with the displacer 12 moving down toward the bottom of tank 22.

The displacer 12 is normally at rest, i.e., stopped, at or slightly above the point in tank 22 where the last interface between phases 132 and 134 was determined to be. On command from computation circuits 100, the displacer 12 can be lowered further in and raised up in tank 22, as discussed above, to periodically provide new liquid level information. Computation circuits 100 can be programmed to obtain liquid level information at predetermined times and/or can be manually activated to get a new set of liquid level data, e.g., by the tank farm operator.

First and second restrictor pegs 50 and 52 are provided as a safety feature to prevent an undue amount of strain being applied to first and second elongate elements 42 and 44. Thus, with ever increasing amounts of strain, the second elongated element 44 eventually will come in contact with one of the first and second restrictor pegs 50 and 52, respectively. This contact will stop any further increases in the strain on the first and second elongated elements 42 and 44 and, thus, prevent the breakage of either first and/or second elongated elements 42 and 44.

While this invention has been described with respect to various specific examples and embodiments, it is to be understood that the invention is not limited thereto and that it can be variously practiced within the scope of the following claims.

I claim:

1. A liquid level gage system comprising: a cable; a rotatable drum; a displacer secured to said cable and moveable in response to winding or unwinding said cable around or from around said rotatable drum; a driven shaft coupled to said rotatable drum; a drive assembly operatively coupled to said driven shaft to drive said driven shaft; an indicator assembly operatively coupled to said driven shaft to provide an indication of a change in the apparent weight of said displacer as said displacer is moved across a liquid level, said indicator assembly including an elongated member secured to said driven shaft and a strain gage secured to said elongated member away from said driven shaft; and a movement restrictor component located to contact said elongated member to provide the operative coupling between said drive assembly and said driven shaft, and together with said driven shaft acting to place a strain on said elongated member, said strain being sensed by said strain gage and being variable in response to variations in the apparent weight of said displacer, said strain gage providing a signal which is indicative of the amount of strain on said elongated member.

2. The liquid level gage system of claim 1 wherein said drive assembly further includes a strain limiting component located to limit the amount of strain imposed on said elongated member.

3. The liquid gage system of claim 2 wherein said strain limiting component is located on a driven gear. of said drive assembly.

4. The liquid level gage system of claim 1 wherein said drive assembly includes a driven gear on which is located said movement restrictor. component.

5. The liquid level gage system of claim 4 wherein said drive assembly further includes a strain limiting component located to limit the amount of strain imposed on said elongated member, said strain limiting component being located on said driven gear.

6. The liquid level gage system of claim 1 wherein said rotatable drum is magnetically coupled to said driven shaft, and said drive assembly includes a bi-directional servo motor having a motor shaft, a driven gear operatively coupled to said driven shaft and a worm gear coupled to both said motor shaft and said driven gear.

7. The liquid level gage system of claim 6 which further comprises position means acting to sense the number of full revolutions said motor shaft has gone through at a given time and to sense the amount of a fractional revolution said motor shaft has gone through at a given time.

8. The liquid level gage system of claim 1 wherein said strain gage is included in a bridge circuit which produces a signal indicative of the apparent weight of said displacer.

9. The liquid level gage system of claim 1 which further comprises a first power coil and a second power coil which is rotatable relative to said first power coil and is in direct electrical communication with said indicator assembly, said first power coil is in electrical communication with a source of electrical power and is located relative to said second power coil so as to provide electrical power to said second power coil for operation of said indicator assembly; and a first data coil and a second data coil which is rotatable relative to said first data coil and is in electrical communication with said indicator assembly and receives said signal indicative of the amount of strain on said elongated member, said first data coil being located relative to said second data coil so as to receive a signal from said second data coil which varies in response to changes in the apparent weight of said displacer.

10. The liquid level gage system of claim 9 wherein said second power coil and said second data coil are rotatable with said driven shaft.

11. The liquid level gage system of claim 9 wherein said indicator assembly includes a first processor board which is rotatable with said driven shaft and provides said signal from said indicator assembly to said second data coil, and said liquid level gage system further comprises a second processor board which is stationary relative to said driven shaft and is in electrical communication with said first power coil and said first data coil, said second processor board adapted to receive a signal from said first data coil which varies in response to changes in the apparent weight of said displacer.

12. The liquid level gage system of claim 11 wherein said second processor board includes computation means acting to process said signal from said first data coil into a processed signal representing the apparent weight of said displacer.

13. In a liquid level gage system for determining at least one liquid level in a vessel and including a processor board to receive input information, process data and communicate information, the improvement comprising a light signal detector operatively coupled to said processor board to receive light signals indicative of input information to be received by said processor board and to facilitate receipt of said input information by said processor board; and a remote, manually operable light signal transmitter to transmit said light signals to said light signal detector.

14. The liquid level gage system of claim 13 wherein said light signal detector is included in a protective housing adapted to allow said light signals to be received by said light signal detector from said remote, manually operable light signal transmitter which is located outside said protective housing.

15. The liquid level gage system of claim 13 wherein said light signals are infra-red light signals.

16. The liquid level gage system of claim 13 which further comprises a display assembly operatively coupled to said processor board to provide a visual display of the input information received by said processor board through said light signal detector.

17. The liquid level gage system of claim 13 wherein said light signals transmitted by said remote, manually operable light signal transmitter are indicative of at least one of the following: gage displacer weight; gas specific gravity; liquid specific gravity; and temperature.

18. In a liquid level gage system including a displacer secured to a cable and moveable in response to winding or unwinding said cable around or from around a rotatable drum, said rotatable drum being coupled to a driven shaft, a drive assembly operatively coupled to said driven shaft to drive said driven shaft, and an indicator assembly operatively coupled to said driven shaft to provide a signal which varies in response to changes in the apparent weight of said displacer as said displacer is moved across a liquid level, the improvement which comprises: a first power coil and a second power coil which is rotatable relative to said first power coil and is in electrical communication with said indicator assembly, said first power coil being in electrical communication with a source of electrical power and being located in a transformer-like relationship with said second power coil so as to provide electrical power from said source of electrical power to said second power coil for operation of said indicator assembly; and a first data coil and a second data coil which is rotatable relative to said first data coil, said second data coil being in electrical communication with said indicator assembly and receiving said signal from said indicator assembly which varies in response to changes in the apparent weight of said displacer, said first data coil being located in a transformer-like relationship with said second data coil so as to receive a signal from said second data coil which varies in response to changes in the apparent weight of said displacer.

19. The liquid level gage system of claim 18 wherein said second power coil and said second data coil are rotatable with said driven shaft.

20. The liquid level gage system of claim 18 wherein said indicator assembly includes a first processor board which is rotatable with said driven shaft and provides said signal from said indicator assembly to said second data coil, and said liquid level gage system further comprises a second processor board which is stationary relative to said driven shaft and is in electrical communication with said first power coil and said first data coil, said second processor board being adapted to receive a signal from said first data coil which varies in response to changes in the apparent weight of said displacer.

21. The liquid level gage system of claim 20 wherein said second processor board includes computation means acting to process said signal from said first data coil into a processed signal representing the apparent weight of said displacer.

22. The liquid level gage system of claim 20 which further comprises a light signal detector operatively coupled to said second processor board to receive light signals indicative of information to be inputed into said second processor board and to facilitate receipt of said information by said second processor board; and a remote light signal transmitter to transmit said light signals to said light signal detector.

23. The liquid level gage system of claim 22 wherein said light signal detector is included in a protective housing adapted to allow said light signals to be received by said light signal detector from said remote light signal transmitter which is located outside said protective housing.

24. The liquid level gage system of claim 22 wherein said light signals are infra-red light signals.

25. The liquid level gage system of claim 22 which further comprises a display operatively coupled to said second processor board to provide a visual display of the information received by said second processor board through said light signal detector.

26. A liquid level gage system comprising: a cable; a rotatable drum; a displacer secured to said cable and moveable in response to winding or unwinding said cable around or from around said rotatable drum; a driven shaft coupled to said rotatable drum; a drive assembly operatively coupled to said driven shaft to drive said driven shaft; an indicator assembly operatively coupled to said driven shaft to provide an indication of a change in the apparent weight of said displacer as said displacer is moved across a liquid level, said indicator assembly including an elongated member secured to said driven shaft, a strain gage secured to said elongated member away from said driven shaft, and a substantially opposing strain gage secured to said elongated member away from said driven shaft, said strain gage being under tension, and said substantially opposing strain gage being under compression, said elongated member having a strain thereon, said strain being sensed by both said strain gage and said substantially opposing strain gage and being variable in response to variations in the apparent weight of said displacer, each of said strain gage and said substantially opposing strain gage providing a signal which is indicative of the amount of strain on said elongated member.

* * * * *

UNITED STATES PATENT AND TRADEMARK OFFICE
CERTIFICATE OF CORRECTION

PATENT NO. : 5,136,883
DATED : August 11, 1992
INVENTOR(S) : Jannotta

It is certified that error appears in the above-indentified patent and that said Letters Patent is hereby corrected as shown below:

Column 4, line 25, delete "generaly" and insert in place thereof --generally--.

Column 10, line 3, delete "restrictor." and insert in place thereof --restrictor--.

Column 10, line 2, delete "gear" and insert in place thereof --gear--.

Signed and Sealed this

Fourteenth Day of September, 1993

Attest:

BRUCE LEHMAN

Attesting Officer

Commissioner of Patents and Trademarks